US007058592B1

(12) United States Patent
Heckerman et al.

(10) Patent No.: US 7,058,592 B1
(45) Date of Patent: Jun. 6, 2006

(54) TRANSMISSION OF INFORMATION DURING AD CLICK-THROUGH

(75) Inventors: David E. Heckerman, Bellevue, WA (US); D. Maxwell Chickering, Redmond, WA (US); Daniel Rosen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 645 days.

(21) Appl. No.: 09/450,262

(22) Filed: Nov. 29, 1999

(51) Int. Cl.
*G06F 17/60* (2006.01)
(52) U.S. Cl. ..................................................... 705/14
(58) Field of Classification Search .................. 705/14
See application file for complete search history.

(56) References Cited

U.S. PATENT DOCUMENTS

| 5,847,061 | A | * | 12/1998 | Maekawa et al. | ........... | 709/219 |
|---|---|---|---|---|---|---|
| 5,933,811 | A | * | 8/1999 | Angles et al. | ................. | 705/14 |
| 6,084,628 | A | * | 7/2000 | Sawyer | ........................ | 725/34 |
| 6,134,532 | A | * | 10/2000 | Lazarus et al. | ................ | 705/14 |
| 6,285,987 | B1 | * | 9/2001 | Roth et al. | ..................... | 705/27 |
| 6,343,274 | B1 | * | 1/2002 | McCollom et al. | ............ | 705/26 |

FOREIGN PATENT DOCUMENTS

WO    WO 200075835    * 12/2000

OTHER PUBLICATIONS

Anonymous, 3SI: justClick, Mar. 9, 1998, M@Presswire.*
Hardgrove, Amy, Getting up to speed on the information superhighway, Grocery Headquarters, Jan 1, 1999, Trade□□(Dialogue file 16; Ref#: 07049555.*
Provisional application entitled "A Cluster-Based Approach for Targeted Item Delivery with Inventory Management,"U. S. Appl. No. 60/142,330, filed Jul. 3, 1999.

* cited by examiner

*Primary Examiner*—James Myhre
*Assistant Examiner*—Daniel Lastra
(74) *Attorney, Agent, or Firm*—Amin & Turocy, LLP (57) ABSTRACT

The transmission of information during ad click-through is disclosed. In one embodiment, a computer-implemented method selects an ad to be displayed on a web page, as one of a plurality of ads within a current cluster in which each of the ad has a probability to be selected. The method displays the ad on the web page, and then detects activation—for example, click-through—of the displayed ad. The method transmits information to an entity associated with the ad, such as an advertiser, upon detecting click-through or other activation of the ad. In one embodiment, the information transmitted includes information regarding the current cluster.

24 Claims, 5 Drawing Sheets

TRANSMISSION OF INFORMATION DURING AD CLICK-THROUGH

FIELD OF THE INVENTION

This invention relates generally to the activation of ads displayed on web pages, such as the clicking-through of banner ads, and more specifically to transmitting information during such banner ad activation.

BACKGROUND OF THE INVENTION

The Internet has become increasingly popular with end users, to the extent that advertisers have become attracted to this new medium. A typical type of Internet ad is known as the banner ad, which is generally displayed on the top of each web page. Operators for popular news and other sites, for example, can increase revenue by selling banner ad space to advertisers.

Frequently, advertisers choose sites to pay for banner ad space based on two criteria. First, advertisers pay to have their ads shown to specific types of people. For example, a golf store might want to have its ads shown on a sports-related page, or to people who are likely to be interested in golf based on their browsing history. Second, advertisers pay to have their ads served in such a way that they are likely to be "clicked on", so that the user will be transported to the advertiser's web site. The click through rate of an ad is the percentage of times a user clicks on the ad to be transported to the advertiser's web site, against the number of times the ad is shown. Advertisers in need of advertising are thus attracted to sites that generate click through, and are usually willing to pay extra to those sites that can deliver increased click through.

Thus, when a consumer clicks on an advertiser's banner ad, the consumer is transported to the advertiser's web site. Because of the nature of the transport protocol used for nearly all web browsing, a protocol known as HyperText Transport Protocol (HTTP), the advertiser knows the identification of the web page from which the user was transported to the advertiser's site. However, the advertiser typically receives little other information. Significantly, for example, the advertiser does not receive information regarding the consumer that has just been transported to the advertiser's site.

This is problematic in the context of web-based advertising, because, unlike other advertising mediums such as television, radio, and print, web-based advertising is supposed to be targeted advertising. For example, a television ad generally cannot be specifically tailored for each individual viewer, because of the constraints of the technology: television is a broadcast medium. However, theoretically, a web ad can be specifically tailored for each individual user, because the Internet is a technology that permits different information to be sent to each individual user.

This theoretical ability of the web for targeted advertising is, unfortunately, muted in the context of banner ad click-through, since the advertiser does not have any specific information regarding the user who has just been transported to its web site. For this and other reasons, therefore, there is a need for the present invention.

SUMMARY OF THE INVENTION

The invention relates to the transmission of information during ad click-through. In one embodiment, a computer-implemented method selects an ad to be displayed on a web page, as one of a plurality of ads within a current cluster in which each of the ads has a probability to be selected. The method displays the ad on the web page, and then detects activation—for example, click-through—of the displayed ad. The method transmits information to an entity associated with the ad, such as an advertiser, etc., upon detecting click-through or other activation of the ad. In one embodiment, the information transmitted includes information regarding the current cluster.

A cluster of ads usually has information associated with it. For example, the ads may have been clustered because of common demographic features regarding the users most likely to click on those ads when they are displayed to those users. The ads may have also been clustered as a result of the commonality of a group of web pages on which display of the ads yields optimal click-through—for example, sports-related web pages may be dominant for a given cluster of ads. Furthermore, the ads may have been clustered as a result of information provided by the ads' advertisers themselves.

Embodiments of the invention thus provide advantages not found in the prior art. Transmitting information to the advertiser when its ad is clicked on, for example, may include information regarding the cluster in which the ad has been allocated. On click-through, then, the advertiser may not learn specific personal information regarding the user who clicked on the ad—an important privacy concern for many users—but the advertiser does learn some general information regarding the group of users the user is in, or other information by which the clusters were defined. For example, the advertiser may learn that the ad was displayed primarily on sports and international news pages, such that the advertiser is able to tailor the web site displayed to the user based on this information.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
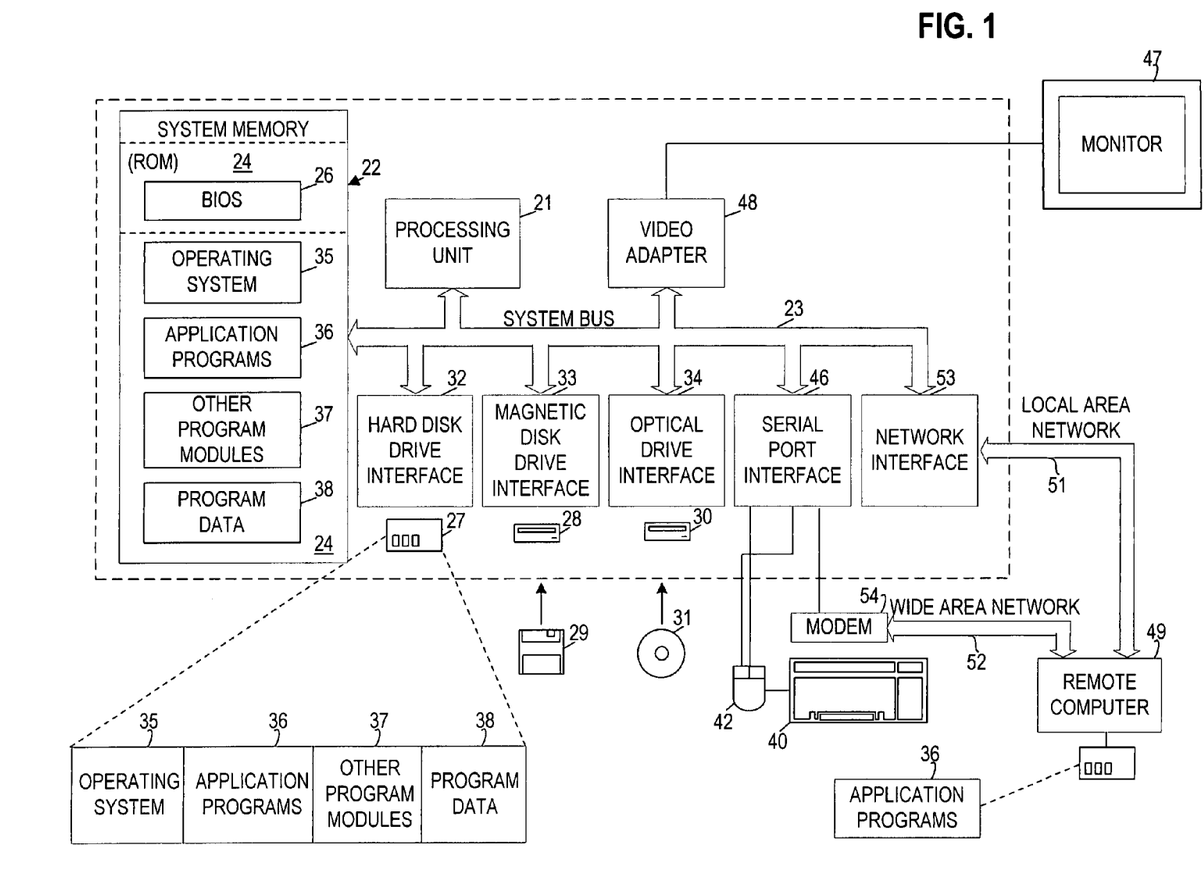
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Banner Ads

Figure 2:
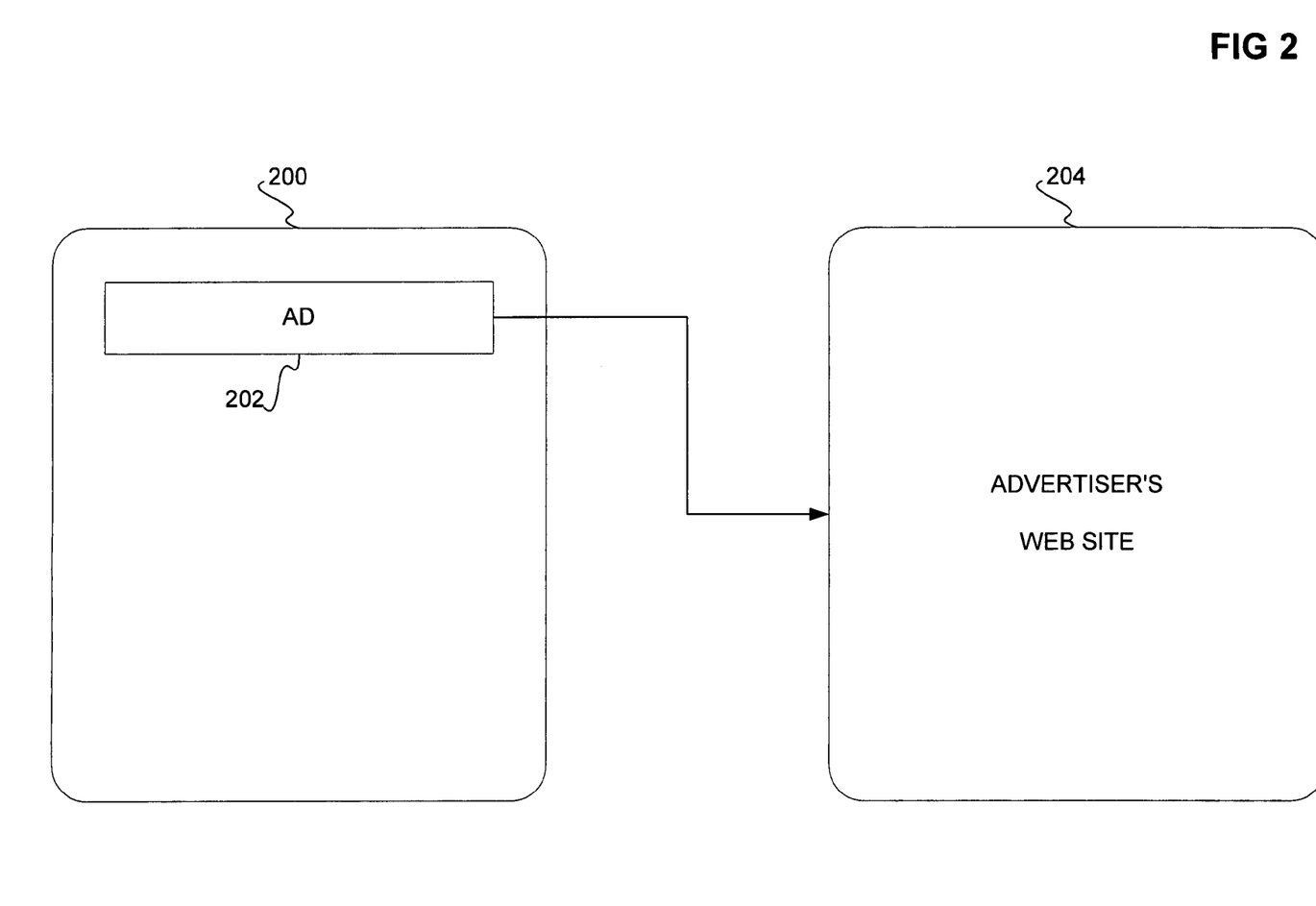
FIG. 2 is a diagram illustrating a banner ad on a web page, and how clicking on the ad transports the user to another web page.

In this section of the detailed description, an overview of banner ads on web pages is provided. Embodiments of the invention are amenable to application with such banner ads; however, the invention itself is not so limited. Referring to FIG. 2, a diagram is shown in which the web page 200 includes a banner ad 202. The web page 200 is typically displayed on a user's computer, within a web browser computer program as known within the art. The banner ad 202 is a specific example of what is referred to generally herein as an item, or as a display message. That is, an item or a display message as described herein is inclusive of a banner ad, but the invention itself is not so limited.

The user is able to navigate within the web page 200 by causing movement of an arrow pointer (not shown in FIG. 2) with a pointing device, such as a mouse, trackball, etc. The user is thus able to position the arrow pointer over the ad 202, and activate the ad 202, by clicking a pointing device button while the arrow pointer is positioned over the ad 202. Activation as the term is used herein is a general term meant to encompass clicking on the ad to accomplish click-through, as known in the art. Thus, activating the ad 202 results in a new web page 204 being displayed within the user's browser program. The term activation is used instead of the more specific clicking, or clicking on, because the ad may be able to be activated by manners other than pointing device button actuation. For example, corresponding key strokes on the keyboard may also accomplish activation, while other manners may also be possible. Thus, the invention is not limited to activation via clicking.

The resulting display of the web page 204 as a result of clicking on the ad 202 is also referred to herein as transporting the user to the web page 204. Usually, the web page 204 will be a part of the web site of the advertiser sponsoring the ad 202 on the web page 200. Usually as well, the original web page 200 is not part of the advertiser's web site, but rather is part of a web site on which the advertiser has purchased advertising, that is, purchased space on the web site for displaying ads such as the ad 202. Embodiments of the invention provide for transmission of information to the advertiser coincident with the activation of the ad 202 and the transportation of the user to the web page 204, such that, for example, the web page 204 displayed to the user can be tailored specifically for the user engaging in the specific web-browsing session. This is described later in the detailed description.

Ads and Clusters

In this section of the detailed description, ads and clusters are specifically described. As mentioned in the previous section of the detailed description, ads are a specific type of item or display message. Thus, while the description in this section focuses on ads, this is for illustrative purposes only, and is not meant to convey a limitation on the invention itself.

Figure 3:
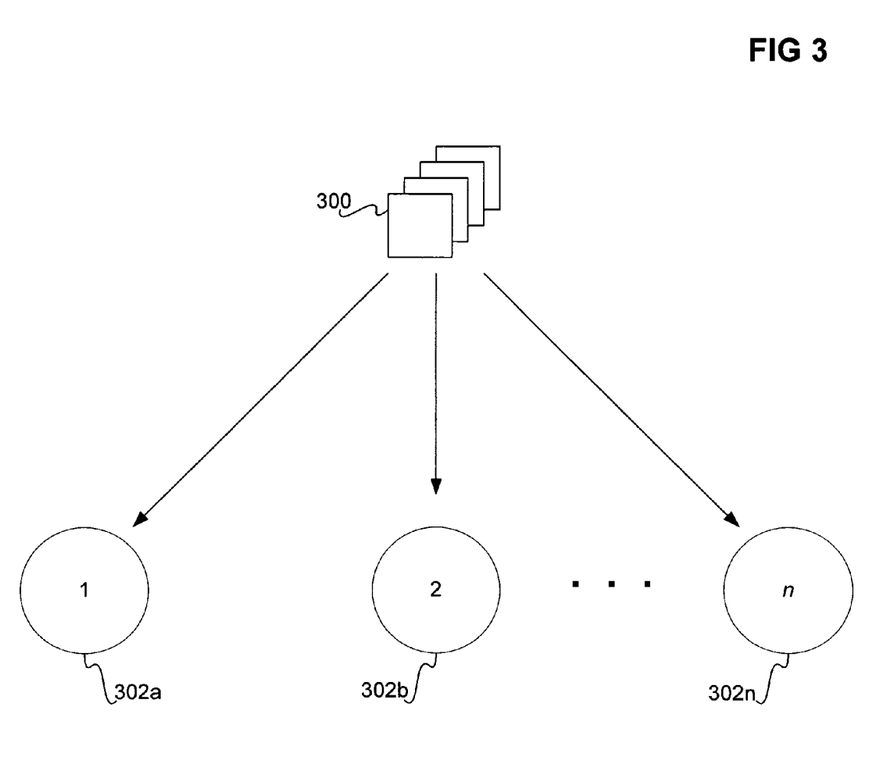
FIGS. 3 and 4 are diagrams of clusters and ads, in conjunction with which embodiments of the invention can be practiced; and, FIG. 5 is a flowchart of a method according to an embodiment of the invention.

Referring first to FIG. 3, a diagram is shown in which each of a plurality of ads 300 is allocated to one or more of the clusters 302a, 302b, . . . , 302n. The clusters are used to determine which ads are to be displayed for a given set of web pages linked to a given cluster. The clusters are defined in one embodiment of the invention to maximize click-through, or activation, of the ads within the clusters. For example, the clusters may be defined using user demographic information and user web-page browsing history and habit information, and it may be known that users of particular demographics when browsing particular types of web pages are more likely to click on certain types of ads. A cluster could then be defined for users of such demographics when browsing such web pages, such that ads of those type are allocated to that cluster. In another embodiment of the invention, the clusters are defined also utilizing information from advertisers themselves, such as information regarding the purchasing decisions of users.

The invention is not limited to a manner by which ads are allocated to clusters, nor to a particular definition of clusters. In one embodiment of the invention, the clusters are defined and the ads are allocated as described in the copending and coassigned provisional application entitled "A Cluster-Based Approach for Targeted Item Delivery with Inventor Management," filed on Jul. 3, 1999, and assigned Ser. No. 60/142,330. This application specifically describes definition of clusters and allocation of ads thereinto such that quotas for ads are accounted for, where a quota for an ad is the minimum number of times an ad must be displayed on a given web site or group of web pages over a predetermined amount of time.

Figure 4:
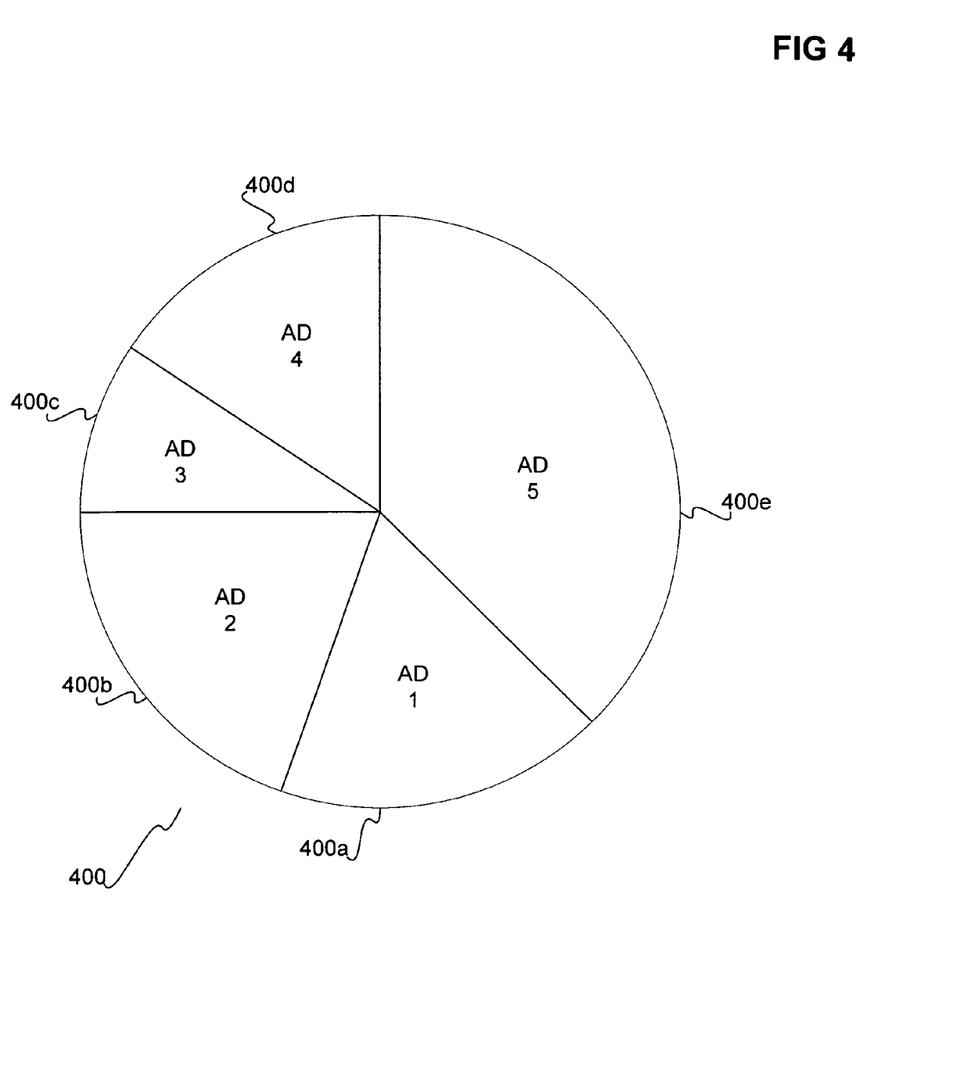

As has been mentioned, when a user is browsing a particular web page, the cluster in which the user is currently, based on information such as but not limited to information regarding the user itself as well as the identification and/or type of the particular web page, determines the ads the user will see on that web page. More specifically, this process is described in conjunction with FIG. 4. In FIG. 4, a cluster 400 has a number of ads 400a, 400b, 400c, 400d and 400e allocated thereto. The diagram of FIG. 4 is depicted as a pie chart, where each of the ads allocated to the cluster has a different slice of the pie. The slice for a given ad corresponds to the ad's probability of being displayed when it is determined that an ad within the cluster 400 must be shown. For example, if the cluster in which the user is currently assigned is the cluster 400, then the ad specifically displayed to the user will be one of the ads 400a, 400b, 400c, 400d and 400e. The specific one of the ads is based on the probability that each of the ads has of being displayed. For example, a random number between zero and one can be determined, and based on that random number, a corresponding one of the ads is selected for display.

Methods

In this section of the detailed description, description of methods according to varying embodiments of the invention is presented. The methods are particularly described in conjunction with FIG. 5, which is a flowchart of a method according to differing embodiments. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 5:
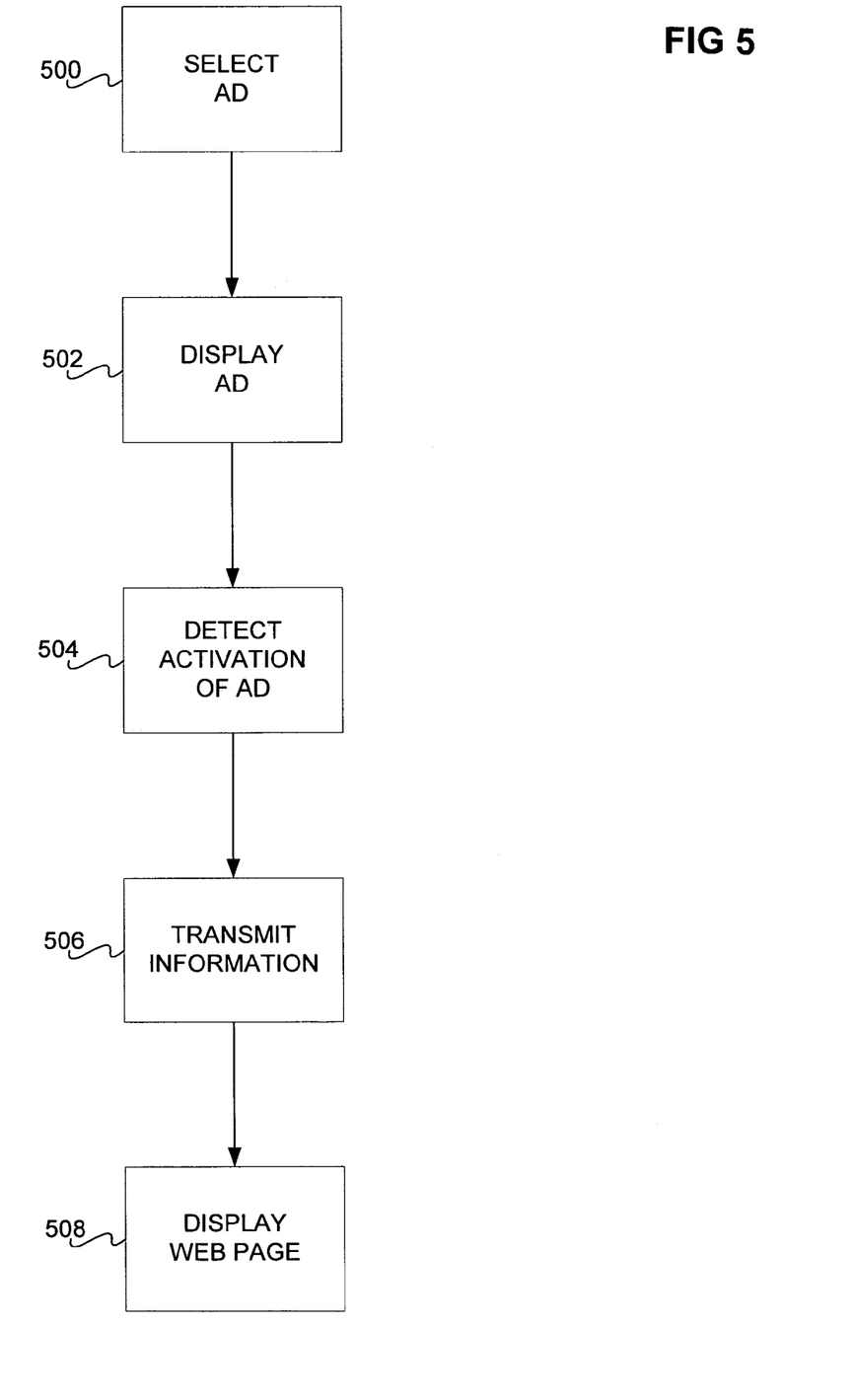

In 500, an ad is selected to be displayed on a web page. The ad is one of a number of ads within a current cluster, where each of the ads has a probability that it is to be selected as the ad to be displayed, a probability referred to as the selection probability. The ad is a specific type of item or display message, such that the invention is not limited to only an ad being selected. In 502, the selected ad is displayed, for example, on a web page of a web site.

In 504, activation of the displayed ad is detected. For example, the displayed ad may be clicked on, or otherwise activated. Then, in 506, information is transmitted to an entity associated with the ad, upon detecting of ad activation. The information transmitted can include information regarding the current cluster. For example, demographic and other information by which the current cluster is defined can be transmitted. The entity associated with the ad can be an advertiser sponsoring the ad, or another organization or business, for example.

The current cluster may be part of one of a number of clusters, such that the clusters may be defined based on information provided by the entity, such as purchase information regarding the products being advertised on the web site of which the web page is a part, so that, for example, the clusters are defined so as to maximize the purchase of the advertiser's products. The ads may conversely not advertise any specific products, but rather be related to the entity so as to promote the entity's brand image. Finally, in 508, a web page associated with the ad is displayed to the user, such that the user is referred to as being transported to the advertiser's web site.

The information transmitted in 506 thus provides for advantages not found in the prior art. For example, the web page associated with the ad that is displayed in 508 can be customized based on this information. This allows for a more targeted type of advertising than is currently possible in the prior art. In addition, the information transmitted in 506 can be tallied by the entity, so that the entity has a record of the types of users who are clicking on its ads, which can be used for other promotional purposes, for verification purposes against the information provided by the operator on the site on which the advertiser is advertising, etc.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   selecting an ad to be displayed on a web page as one of a plurality of ads within a current cluster, each of the plurality of ads having a respective selection probability for being displayed;
   displaying the ad selected on the web page;
   detecting activation of the ad displayed; and,
   transmitting information to an entity associated with the ad upon detecting activation of the ad displayed, the transmitted information comprising information regarding the current cluster.

2. The method of claim 1, further comprising displaying a web page associated with the entity associated with the ad.

3. The method of claim 1, wherein the current cluster is one of a plurality of clusters, the plurality of clusters based on information provided by at least the entity.

4. The method of claim 1, wherein detecting activation of the ad display comprises detecting clicking on of the ad displayed.

5. The method of claim 1, wherein at least some of the plurality of ads are related to the entity for promoting a brand image of the entity.

6. The method of claim 1, wherein the entity comprises one of: a vendor, an advertiser, an organization, and a business.

7. The method of claim 1, further comprising dynamically tailoring the web page based upon the transmitted information.

8. The method of claim 1, further comprising dynamically tailoring the ad displayed based upon the transmitted information.

9. A computer-implemented method comprising:
   detecting activation of a display message, the display message associated with a current cluster and having a selection probability within the current cluster for being displayed;
   transmitting information to an entity associated with the display message upon detecting activation of the display message, the information comprising information regarding the current cluster.

10. The method of claim 9, wherein the current cluster is one of a plurality of clusters, the plurality of clusters based on information provided by at least the entity.

11. The method of claim 9, wherein the entity comprises one of: a vendor, an advertiser, an organization, and a business.

12. The method of claim 9, further comprising dynamically tailoring a display based upon the information regarding the current cluster.

13. The method of claim 9, further comprising dynamically tailoring the display message based upon the information regarding the current cluster.

14. A machine-readable medium having instruction stored thereon for execution by a processor to perform a method comprising:
   selecting an ad to be displayed on a web page as one of a plurality of ads within a current cluster, each of the plurality of ads having a respective selection probability for being displayed;
   displaying the ad selected on the web page;
   detecting activation of the ad displayed; and,
   transmitting information to an entity associated with the ad upon detecting activation of the ad displayed, the transmitted information comprising information regarding the current cluster.

15. The medium of claim 14, the method further comprising displaying a web page associated with the entity associated with the ad.

16. The medium of claim 14, wherein the current cluster is one of a plurality of clusters, the plurality of clusters based on information provided by at least the entity.

17. The medium of claim 14, wherein detecting activation of the ad display comprises detecting clicking on of the ad displayed.

18. The medium of claim 14, wherein at least some of the plurality of ads are related to the entity for promoting a brand image of the entity.

19. The medium of claim 14, wherein the entity comprises one of: a vendor, an advertiser, an organization, and a business.

20. The medium of claim 14, the method further comprising automatically changing at least one of the web page and the ad displayed based upon the information regarding the current cluster.

21. A machine-readable medium having instructions stored thereon for execution by a processor to perform a method comprising:
   detecting activation of a display message, the display message associated with a current cluster and having a selection probability within the current cluster for being displayed;
   transmitting information to an entity associated with the display message upon detecting activation of the display message, the information comprising information regarding the current cluster.

22. The medium of claim 21, wherein the current cluster is one of a plurality of clusters, the plurality of clusters based on information provided by at least the entity.

23. The medium of claim 21, wherein the entity comprises one of: a vendor, an advertiser, an organization, and a business.

24. The medium of claim 21, the method further comprising automatically changing at least one of a display and the display message based upon the information regarding the current cluster.

* * * * *